May 11, 1965 R. P. KRAUSE 3,182,979
FURNACE SUPPORT STRUCTURE
Filed Feb. 26, 1963
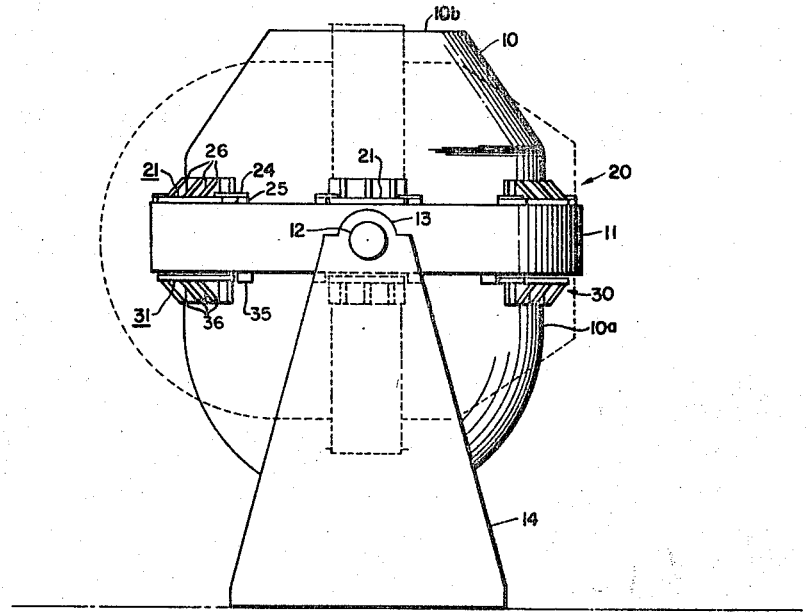
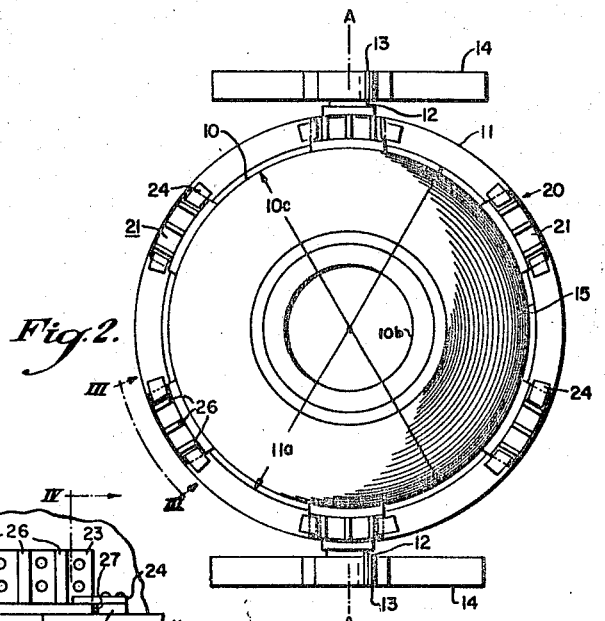
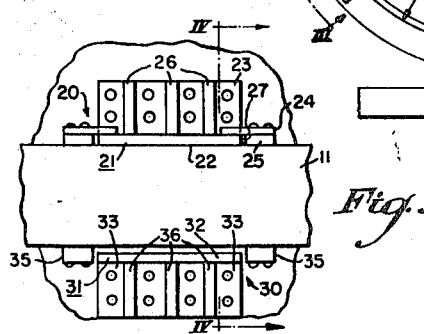
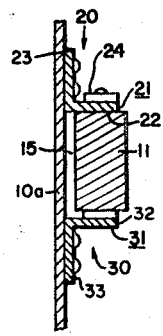
INVENTOR.
Richard P. Krause
BY
Green, McCallister + Miller
HIS ATTORNEYS.

3,182,979
FURNACE SUPPORT STRUCTURE
Richard P. Krause, Butler, Pa., assignor to Pennsylvania Engineering Corporation, New Castle, Pa., a corporation of Pennsylvania
Filed Feb. 26, 1963, Ser. No. 260,997
8 Claims. (Cl. 263—33)

This invention relates to improved supporting structure for furnace vessels, such as oxygen and Bessemer converters, which are required, for their operation, to turn about a horizontal axis, and which are subject to dimensional changes resulting from thermal expansion and contraction, and from stress-induced creep growth.

More particularly, this invention relates to structure for connecting a furnace vessel to a supporting trunnion ring in such a manner that relative dimensional changes between the furnace vessel and the trunnion ring will not induce localized stresses in the vessel that could tend to cause its premature structural failure. This invention also relates to trunnion ring connecting structure that maintains the shape of the furnace vessel for all conditions of loading and orientation, and avoids localized failure-causing stresses that would be otherwise induced in the furnace vessel due to deformation thereof.

In the metal refining art, furnace vessels, such as oxygen and Bessemer converters, and other material-carrying vessels, such as ladles and slag pots, have long been supported for turning movement about a horizontal axis, by a trunnion ring that surrounds the vessel. In oxygen converters the longitudinal height of the trunnion ring is often as large as eight feet. In the vast majority of such trunnion-mounted vessels, the trunnion ring is rigidly secured to the vessel. As thermal expansion and stress induced creep-growth occur in the vessel at a greater rate than in the trunnion ring, stresses are induced in the walls of the vessel. Ordinarily, the stresses take the form of shock loadings occurring as the vessel is turned about its axis. Accordingly, it has been necessary to "beef-up" the vessel walls to prevent immediate shear failure. The repeated heating and cooling required of these vessels and stresses resulting therefrom, however, eventually will cause failure of the vessel walls necessitating repair or replacement of the vessel. In oxygen converter installations which commonly employ 200 ton vessels, repair or replacement is an extremely costly proposition.

It has been proposed to support such a vessel within an oversize trunnion ring by a plurality of radially-extending claws that slidably-engage or grip opposed surfaces of the trunnion ring. Such a proposal permits a degree of stress-free radial deformation and expansion between the vessel and the trunnion ring; however, such arrangement makes no provision for longitudinal expansion of the vessel with respect to the vertical extent of the trunnion ring. Accordingly, such a proposal does not completely take into account all expansion-induced dimensional change and the stresses resulting therefrom. Furthermore, such proposals as presently exist do not include means for maintaining the shape and concentricity of the vessel to prevent high local stresses as induced, for example, by deformation and sidewise movement of the vessel side wall when the vessel is rotated to a horizontal position.

I have determined that existing support structures and proposals for improving these support structures do not provide a complete solution to the problem of premature vessel failure, as caused by relative movement between the vessel and its trunnion ring.

Accordingly, an object of my invention has been to fully investigate the requirements of, and factors involved in furnace vessel trunnion support structures, and to devise an improved support structure that will meet the requirements and provide a practical solution to the problems presented by such factors;

Another object of my invention has been to provide connecting structure between a furnace vessel and a surrounding trunnion ring that permits relative radial and longitudinal expansion and contraction movements therebetween;

A further object of my invention has been to provide supporting structure for connecting a furnace vessel to a surrounding trunnion ring that permits relative expansion therebetween, while maintaining the cross-sectional shape of the furnace vessel and the concentricity thereof with respect to the trunnion ring, to thereby prevent deformation-induced localized stresses; and These and other important objects of my invention will appear to those skilled in the art upon reading and understanding the following description of my novel concepts and the illustrative embodiments thereof.

One phase of my invention involves the use of a trunnion ring that has an internal diameter slightly larger than the external diameter of the furnace vessel. The vessel is connected to the ring by a group or plurality of bracket means having thin, radially-extending, coplanar flanges that each have opposed facing surfaces. The opposed surfaces are slidably engaged by means securely connected to the trunnion ring to provide a vertical support of the furnace vessel (whether upright or completely inverted), that is effected at a single transverse cross-sectional plane of the vessel. It will be seen that the provision of a single plane vertical support of the vessel effectively eliminates the harmful effects of longitudinal differential-expansion.

According to another phase of my invention, the struts are each guided radially by cooperating structure that is carried by the trunnion ring to thereby permit radial expansion and contraction of the furnace vessel with respect to the trunnion ring, while maintaining the concentricity of the furnace vessel with respect to the trunnion ring.

Another phase of my invention relates to the use of a first series of at least six connector bracket assemblies or means that have radially-guided flanges, as described above, that are strategically located around the vessel periphery to resist load-induced deformation of the vessel, such as the tendency for the vessel side wall to bulge or ovalize when the vessel is in a horizontal position. Specifially, I have found it to be most advantageous to locate two of the bracket means along the opposed trunnion axes and to space at least four additional bracket means equidistantly around the vessel periphery on opposed sides of the trunnion axis. It will be noted that any strut which merely extends perpendicular to the trunnion axis will not be effective to prevent such deformation of the vessel side wall.

A further phase of my invention relates to the provision of a separate series of radially-extending brackets that serve to assist the first series of brackets in resisting sidewise forces resulting primarily from tilting the vessel. The brackets of the second series can be securely connected to the vessel below the trunnion ring in a spaced relation therefrom, so that they are not effective to absorb any longitudinal force whatsoever, regardless of the orientation of the vessel.

The bottom surface of the trunnion ring is provided with securely-attached guides that engage the sides or peripheral facing surfaces of the struts in the second series, to provide a sidewise force transmitting relationship necessary to proper operation of the second series. Conveniently, but not necessarily, the second series of brackets are aligned vertically with respect to brackets in the first series. In addition to assisting the first series of brackets, the second series of brackets balances the forces for supporting the vessel about the trunnion axis, so as to avoid the introduction of high torques to be resisted by brackets within the first series.

In the accompanying drawings,

FIGURE 1 is a side elevational view of a furnace vessel having trunnion ring support structure according to my invention;

FIGURE 2 is a top or plan view of the furnace vessel shown in FIGURE 1;

FIGURE 3 is a fragmental enlarged view of typical trunnion ring connecting means as seen from line III—III of FIGURE 2; and FIGURE 4 is a fragmental cross-sectional view of a typical trunnion ring connecting means taken along line IV—IV of FIGURE 3.

Referring now more specifically to the drawings, in FIGURES 1 and 2 there is shown a metal refining vessel, molten metal container or furnace vessel 10, such as an oxygen or Bessemer converter, that is carried by a circumscribing carriage member, supporting ring or trunnion ring 11. The vessel 10 has a longitudinally extending metal outer side wall 10a that defines a cavity which terminates in an end located open mouth portion 10b. A pair of outwardly extending pin shafts or trunnions 12 are securely connected to the trunnion ring 11. The trunnions 12 are turnably supported by suitable bearing means 13 in a pair of stationary floor mounted stands 14, whereby the furnace vessel 10 can be turned by suitable machinery (not shown), about a horizontally extending trunnion axis A—A that passes through the trunnions 12.

As shown in FIGURE 2, trunnion ring 11 has an internal diameter 11a that is somewhat larger than the external diameter 10c of the furnace vessel side wall 10a, so that an annular spacing or clearance 15 is provided therebetween. Radial expansion and growth of the furnace vessel side wall 10a with respect to the trunnion ring 11 will merely result in a reduction in the clearance 15.

The open mouth furnace vessel 10 is normally held in a vertical-upright metal-refining position and in accordance with conventional practice is to be moved or rotated about a horizontal axis on the stands 14 to downwardly-tilted and inverted positions. For facilitating the description of the structure, reference will be made to the position of the parts of the combination involved from the standpoint of the vertical upright or refining position of the vessel represented by FIGURE 1 of the drawings. The vessel 10 is positioned or mounted within the annular support or trunnion ring 11 by a group of peripherally spaced-apart connector, bracket means having upper and lower bracket assemblies 20 and 30 and brackets 21 and 31.

As clearly apparent from FIGURES 1 and 3, the assemblies 20 and 30 are in an opposed, vertically spaced-apart or longitudinally spaced-apart relation from the standpoint of the outer metal wall 10a of the furnace vessel 10, and oppose each other in their mounted positions with respect to and in cooperation with the support ring 11. As shown in the drawings, the upper and lower assemblies are of somewhat similar construction, but the upper assembly 20 has means for retaining it in engagement or abutment with the support ring 11. The lower assembly, like the asembly 20, is radially-slidable with respect to the support ring 11, but is mounted in a downwardly-spaced clearance-defining adjacent relation (longitudinally of the vessel 10) with respect to the support ring. This permits relative vertical or longitudinal movement of bracket means 31 and thus, of the vessel wall 10a with respect to the support ring 11, before the means 31 is moved into engagement or abutment with the support ring. Both the upper and lower assemblies have pairs of end guide means, see 25 and 35, that cooperate with opposite ends of their respective brackets 21 and 31 to contain relative peripheral movement between the brackets or the vessel wall and the support ring 11 and, at the same time, provide for or permit radial-slidable movement therebetween.

As shown particularly in FIGURES 1, 3 and 4, the bracket 21 of each upper assembly 20 has a front or forwardly-projecting flange 22 that is connected in an angular relation with an inner or back flange 23 that extends longitudinally or vertically along the outer metal wall of the vessel 10 and is rigidly secured thereto, as by rivets (see particularly FIGURES 3 and 4). Relatively thin-wall, coplanar strut portions 26 of angular shape are provided for each bracket 21. The struts 26, as shown particularly in FIGURES 1 and 3, are peripherally spaced-apart and project across the angle between the front flange 22 and back flange 23 as an integral part of the construction.

The bottom or lower face of the front flange 22 radially-slidably engages or abuts the annular support ring 11 and, particularly as shown in the drawings, its upper edge face. A pair of end guide means 25 are provided adjacent opposite ends of the front flange 22 and carry or mount a pair of guide elements or arms 24 that extend towards each other and slidably-engage the upper face of the front flange 22. As shown particularly in FIGURES 3 and 4, the guide assembly consisting of the end guides 25 and the elements 24 is secured to the ring flange 11, as by rivets. As a result of this construction, as far as each upper assembly 20 is concerned, the vessel 10 is mounted on the support ring 11 for radial-slidable movement between the pair of guide arms or elements 24 and the uper edge face of the support ring 11, relative longitudinal or vertical movement of the outer metal wall of the vessel 10 is restrained by the means 24 and 25 and, at the same time, relative peripheral movement with respect to the support ring is contained by the end guides 25.

Each lower assembly 30 employs bracket means 31 which is similar in construction to the upper bracket means 21, and like the upper assembly, has peripherally spaced-apart struts 36, a front flange 32 and an inner or back flange 33. However, as particularly illustrated in FIGURES 3 and 4, the front flange 32 normally has a downwardly, longitudinally or vertically-spaced clearance-defining relation between its upper face and the lower edge face of the support ring 11, such that relatively longitudinal movement of the vessel wall is permitted before such faces engage each other. Also in the lower assembly 30, the pair of end guides 35, like the end guides 25 of the upper asembly 20, contain relative peripheral movement between the lower bracket 31 and the support ring 11, but do not have means corresponding to the guide elements 24 for maintaining the opposed faces of the front flange and of the support ring in abutment or engagement with each other. Thus, vertical, upward and downward or longitudinal relative movement is permitted between the front flange 32 and the support ring 11. The front flange 22 of each upper bracket 21 is normally retained in engagement or abutment with the support ring 11, while the front flange 32 of each lower bracket 31 is normally out of abutment or engagement with the support ring 11, but may be moved into engagement or abutment when the outer metal wall of the vessel 10 expands, distorts or grows longitudinally.

It will thus be seen that the entire vertical support of the furnace vessel 10 within the trunnion ring 11 is accomplished substantially at the single transverse cross-sectional plane which contains the radially extending peripherally spaced-apart group of brackets 21. Accordingly, longitudinal dimensional changes of the furnace vessel side wall 10a with respect to the trunnion ring 11 will induce no forces therebetween, for example on cooling, and dynamic loadings caused by longitudinal sliding of the vessel as it is inverted are also eliminated.

The brackets 21 also include end means or guide portions 25 for slidably engaging side edge or peripherally facing surfaces or portions 27 of the radially-extending flanges 23 to thereby maintain the concentricity of the furnace vessel side wall 10a with respect to the trunnion ring 11 and prevent localized contact therebetween.

While as few as three radially extending assemblies 20 and 30 could be employed to accomplish the functions thus far described, I prefer to employ six assemblies located as shown in FIGURE 2, wherein an assembly is provided in alignment with each trunnion 12 and the remaining four assemblies are spaced equidistantly therebetween on opposed sides of the trunnion axis A—A. When the furnace vessel 10 is rotated to a horizontal position, as shown by the broken line view of FIGURE 1, its lower side wall 10a will tend to bulge or ovalize due primarily to the stress induced by the contained load. Conceivably such load induced deformation will cause failure of the vessel side wall 10a due to repeated bending thereof. Furthermore, if the vessel side wall 10a deforms sufficiently to cause localized contact with the trunnion ring 11, the resulting high shear force could cause its structural failure. In my invention such bulging is controlled or resisted by locating a pair of the radial brackets 21 and end guide portions 25 therefor at non-perpendicular angles with respect to the trunnion axis A—A. The guided flanges 22 will thus resist any non-uniform deformation of the vessel side wall 10a and the cross-sectional configuration of the vessel 10 will be stabilized.

Referring now to FIGURES 1, 3 and 4, there is shown a further or lower group of trunnion ring connecting bracket assemblies or means 30 which comprises a series or plurality of radially extending brackets 31 that are securely connected to the furnace vessel side wall 10a at spaced locations around its periphery. Unlike the brackets 21, the brackets 31 of the second series can be spaced longitudinally from the trunnion ring 11 (see especially FIGURES 3 and 4) so that no longitudinal force can be transmitted therebetween. The trunnion ring 11 is provided with means or end guides 35 for engaging side edge or peripherally facing surface portions of the flanges 32 within the second series to provide a sidewise force transmitting relationship therebetween. The second series of brackets 31 will thus assist the brackets 21 in maintaining the concentricity of the furnace vessel and in resisting load induced deformation or bulging of the vessel side wall 10a. Furthermore, the brackets 31 of the second series will balance the loading of the vessel as it tilts to prevent the imposition of high torques on the brackets 21 and arm elements 24 of the connecting means 20. It will be appreciated that the brackets 21 and 31 located along the trunnion axis A—A absorb substantially all of the supporting force when the vessel is in a horizontal position. Accordingly, I prefer to "beef-up" or increase the strength of the guides 35 for the trunnion located brackets 31 as compared to the other four sets of guides 35.

In operation, the furnace vessel 10 will be loaded with two hundred tons or more of material to be refined. The material will be heated to a high temperature (3000° F. or more) thus causing the furnace vessel 10 to expand or grow both longitudinally and radially with respect to the much cooler trunnion ring. Also, the liquid load within the vessel 10 will induce hoop and longitudinal stresses in the vessel side wall 10a causing permanent creep growth of the vessel as well as temporary strain growth. Radial growth of the vessel 10 results only in reducing the annular clearance 15 between it and the trunnion ring 11, as the radially extending connecting brackets 21 and 31 will yield or move radially outwardly on the trunnion ring 11. Longitudinal growth of the vessel side wall 10a with respect to the trunnion ring 11 is not felt by the connection therebetween in any way, since such connection exists at substantially a single transverse cross-sectional plane.

At some time or times in the operation of the furnace vessel 10, it will be turned about the trunnion axis A—A, thus causing sidewise forces to be imposed by the vessel weight and the contained load upon the brackets 21 and the brackets 31 that are aligned with the axis A—A. Also the vessel side wall will tend to deform and bulge due to the increased loading forces thereon. All of these forces will be effectively resisted by the force transmitting relationship between the respective side edge portions of the radially extending brackets 21 and 31 and the respective guide means 25 and 35 with which they are slidably engaged.

When the furnace vessel 10 is completely inverted, as for pouring or internal repairs for example, its weight will be carried by the arm elements 24 which engage the normally upper faces or surfaces of the radial extending flanges 22.

In view of the above description, those skilled in the art will recognize that I have provided an improved support structure for connecting a furnace vessel to a trunnion ring, which connecting structure enhances the life of the furnace vessel by eliminating localized forces encountered in current furnace vessel installations as the result of thermal and load induced relative dimensional changes between the furnace vessel and the trunnion ring.

Having thus described my invention, I claim:

1. In an open-mouth furnace vessel for refining metal when it is in a vertical upright position, wherein the vessel is rotatable about a horizontal axis on a pair of stands, and wherein the vessel is subjected to changes in dimension due to the weight of metal therein and due to high temperatures to which it is subjected, a combination that is defined as follows when the vessel is in its vertical upright position: an outer wall about the vessel, an annular support ring in a radially-outwardly spaced and substantially horizontal position about the periphery of said outer wall of the vessel and about the horizontal axis thereof, a group of peripherally spaced-apart bracket means for mounting said outer wall of the vessel on said support ring, said support ring having oppositely-positioned horizontally-projecting trunnions rotatably-mounted on the stands for turning the vessel about its horizontal axis from its vertical upright position to downwardly-tilted and inverted positions; each bracket means of said group comprising, an upper bracket rigidly-secured to said outer wall of the vessel and projecting radially-forwardly therefrom into radial-slidable engagement with said support ring and having means for containing relative peripheral movement of said upper bracket with respect to said support ring and for maintaining said upper bracket in radial-slidable engagement with said support ring against relative longitudinal movement of said outer wall of the vessel with respect to said support ring, a lower bracket rigidly-secured to said outer wall of the vessel and projecting radially-forwardly from said outer wall of the vessel into a cooperating radial-slidable and normally downwardly-spaced clearance-defining relation with said support ring and having means for containing relative peripheral movement of said lower bracket with respect to said support ring and for permitting relative longitudinal movement of said outer wall with respect to said support ring whereby said lower bracket may move into engagement with said support ring, and said lower bracket of each of said bracket means being in an opposed-aligned relation with said upper bracket of the same bracket means longitudinally of the outer wall of the vessel.

2. In a combination as defined in claim 1 wherein, a pair of opposite bracket means of said group are positioned in alignment with the axis of rotation of said trunnions, and the other bracket means of said group are in a substantially equally-spaced relation about the periphery of said support ring with respect to each other and with respect to said pair of opposite bracket means.

3. A combination as defined in claim 1 wherein said upper and lower brackets of each bracket means of said group is of angular shape and has peripherally spaced-apart struts thereon of relatively thin metal section.

4. A combination as defined in claim 1 wherein, said upper and lower brackets of each bracket means of said group have a radially-extending front flange and a back flange extending longitudinally of said outer wall of the furnace that are connected in an angular relation, the back flange of each of said upper and lower brackets is rigidly-secured to said outer wall of the furnace, the front flange of each of said upper and lower brackets is positioned in cooperative alignment with upper and lower annular edge faces of said support ring, and the front flange of the upper bracket is in an opposed space-apart relation with respect to the front flange of said lower bracket of each bracket means.

5. A combination as defined in claim 4 wherein, a pair of peripherally spaced-apart end guides are rigidly secured to an upper annular edge face of said support ring in an opposed relation with each other and in adjacent positions with opposite ends of the front flange of said upper bracket, a pair of guide elements are provided, said guide elements are secured on said end guides to project towards each other along an upper face of the front flange of said upper bracket to retain it in a radially-slidable and abutting relation with the upper annular edge face of said support ring and to contain relative longitudinal movement of said outer metal wall of the furnace with respect to said support ring.

6. A combination as defined in claim 5 wherein, a pair of end guides are secured on a lower annular edge face of said support ring in a peripherally spaced-apart relation with each other and in a closely adjacent relation at opposite ends of the front flange of said lower support bracket, and the front flange of said lower support bracket normally has a slight downward-spaced clearance-defining relation with respect to the lower annular edge face of said support ring.

7. In an open-mouth furnace vessel for refining metal when it is in a vertical upright position, wherein the vessel is rotatable about a horizontal axis on a pair of stands, and wherein the vessel is subjected to changes in dimension due to the weight of metal therein and due to high temperatures to which it is subjected, a combination that is defined as follows when the vessel is in its vertical upright position: an outer wall about the vessel, an annular support ring in a radially-outwardly spaced and substantially horizontal position about the periphery of said outer wall of the vessel and about the horizontal axis thereof, peripherally spaced-apart groups of connector means secured to said outer wall of the vessel and slidably-cooperating with said support ring for mounting the vessel on said support ring, said support ring having oppositely-positioned horizontally-projecting trunnions rotatably-mounted on the stands for turning the vessel about its horizontal axis from its vertical upright position to downwardly-tilted and inverted positions; each connector means of said group comprising, an upper means cooperating with an upper annular edge face of said support ring and a lower means cooperating with an opposite lower annular edge face of said support ring, said upper means having a radially-outwardly-projecting front flange with its bottom face positioned in abutment with the top edge face of said support ring and having a back flange connected in an angular relation to said front flange and secured to and projecting longitudinally of said outer wall of the vessel, a pair of peripherally spaced-apart end guides secured to the upper edge face of said support ring at opposite ends of said front flange to radially-slidably retain said front flange therebetween and to contain relative peripheral movement of said outer wall with respect to said support ring, a pair of guide elements, one guide element being secured on one of said end guides and the other guide element being secured on the other of said end guides to project towards each other in a closely-abutting relation with the upper face of said front flange to retain said front flange in a radially-slidable abutting relation with the upper face edge of said support ring between said pair of end guides and thus resist longitudinal movement of said outer wall of the vessel with respect to said support ring; each lower means of said group comprising, a radially-outwardly projecting front flange having its upper face positioned in a slightly downwardly-spaced adjacent relation along the lower edge face of said support ring, a back flange connected in an angular relation to said front flange and secured to and projecting longitudinally of said outer wall of the vessel, a pair of peripherally spaced-apart end guides secured to the lower edge face of said support ring at opposite ends of said front flange to radially-slidably retain said front flange therebetween and to contain relative peripheral movement of said outer wall of the furnace with respect to said support ring and to permit longitudinal movement of said outer wall of the vessel along the spacing between said front flange and said support ring whereby said front flange may move into abutment with the lower edge face of said support ring, said upper and lower means of each said connector means of said group being in an opposed-aligned relation with each other longitudinally of said outer wall of the vessel, said front flanges of said upper means of said group being positioned on a common transverse plane parallel to the horizontal axis of the vessel, and said front flanges of said lower means of said group being positioned on a common transverse plane parallel to the horizontal axis of the vessel and below the transverse plane of said front flanges of said upper means and normally in a spaced relation below the lower edge face of said support ring.

8. In an open-mouth furnace vessel for refining metal when it is in a vertical upright position, wherein the vessel is rotatable about a horizontal axis on a pair of stands, and wherein the vessel is subjected to changes in dimension due to the weight of metal therein and due to high temperatures to which it is subjected, a combination that is defined as follows when the vessel is in its vertical upright position: an outer wall about the vessel, an annular support ring in a radially-outwardly spaced and substantially horizontal position about the periphery of said outer wall of the vessel and about the horizontal axis thereof, peripherally spaced-apart groups of connector bracket means secured to said outer wall of the vessel and slidably-cooperating with said support ring for mounting the vessel on said support ring, said support ring having oppositely-positioned horizontally-projecting trunnions rotatably-mounted on the stands for turning the vessel about its horizontal axis from its vertical upright position to downwardly-tilted and inverted positions; each connector bracket means of said group comprising, an upper bracket cooperating with an upper annular edge face of said support ring and an opposed lower bracket cooperating with an opposite lower annular edge face of said support ring, said upper bracket having a radially-outwardly-projecting front flange with its bottom face positioned in abutment with the top edge face of said support ring and having a back flange connected in an angular relation to said front flange and secured to and projecting longitudinally of said outer wall of the vessel, peripherally spaced-apart struts projecting across the angle between said front and back flanges and secured thereto, a pair of peripherally spaced-apart end guides secured to the upper edge face of said support ring at opposite ends of said front flange to radially-slidably retain said front flange therebetween and to contain relative peripheral movement of said outer metal wall with respect to said support ring, a pair of guide elements, one guide element being secured on one of said end guides and the other guide element being secured on the other of said end guides to project towards each other in a closely-abutting relation with the upper face of said front flange to retain said front flange in a radially-slidable abutting relation with the upper face edge of said support ring between said pair of end guides and thus resist longitudinal movement of said outer wall of the vessel with respect to said support ring; each lower bracket of said group comprising, a radially-outwardly projecting front flange having its upper face positioned in a slightly downwardly-spaced adjacent relation along the lower edge face of said support ring, a back flange connected in an angular relation to said front flange and secured to and projecting longitudinally of said outer wall of the vessel, peripherally spaced-apart struts projecting across the angle between said front and back flanges and secured thereto, and a pair of peripherally spaced-apart end guides secured to the lower bottom edge face of said support ring at opposite ends of said front flange to radially-slidably retain said front flange therebetween and to contain relative peripheral movement of said outer wall of the vessel with respect to said support ring, and to permit longitudinal movement of said outer wall of the vessel along the spacing between said front flange and said support ring whereby said front flange may move into abutment with the lower edge face of said support ring, a pair of said connector bracket means being positioned in an aligned relation with respect to the horizontal axis of the vessel, and all of said connector bracket means being positioned in a substantially equally-spaced relation about the vessel.

References Cited by the Examiner

UNITED STATES PATENTS

| | | | |
|---|---|---|---|
| 1,042,876 | 10/12 | Blackwood | 266—35 |
| 2,205,940 | 6/40 | Astrom | 266—39 |
| 3,000,621 | 9/61 | Puxkandl | 266—39 |

FOREIGN PATENTS

| | | |
|---|---|---|
| 228,381 | 3/59 | Australia. |

CHARLES SUKALO, *Primary Examiner.*